United States Patent [19]

Toya

[11] Patent Number: 4,848,840
[45] Date of Patent: Jul. 18, 1989

[54] LOCKING MECHANISM FOR ARMREST

[75] Inventor: Shinichi Toya, Akishima, Japan

[73] Assignee: Tachi-s Co., Ltd., Tokyo, Japan

[21] Appl. No.: 230,967

[22] Filed: Aug. 11, 1988

[51] Int. Cl.⁴ .............................................. A47C 7/54
[52] U.S. Cl. ................................... 297/417; 297/335
[58] Field of Search ............... 297/417, 336, 335, 113

[56] References Cited

U.S. PATENT DOCUMENTS

| 984,474 | 2/1911 | Dann | 297/335 |
|---|---|---|---|
| 1,262,596 | 4/1918 | Bishop | 297/335 |
| 2,824,599 | 2/1958 | Quinlan | 297/113 |
| 3,909,063 | 9/1975 | Bonisch et al. | 297/417 |
| 4,219,235 | 8/1980 | Heling | 297/417 |
| 4,435,011 | 3/1984 | Hakamata | 297/417 |
| 4,558,901 | 12/1985 | Yokoyama | 297/113 |
| 4,668,010 | 5/1987 | Fujiwara | 297/417 |

FOREIGN PATENT DOCUMENTS

| 2931237 | 2/1981 | Fed. Rep. of Germany | 297/113 |
|---|---|---|---|
| 2932347 | 2/1981 | Fed. Rep. of Germany | 297/417 |
| 3539258 | 5/1986 | Fed. Rep. of Germany | 297/417 |

Primary Examiner—Francis K. Zugel
Attorney, Agent, or Firm—Browdy and Neimark

[57] ABSTRACT

A locking mechanism for armrest which comprises an arcuate slot, a pair of upper and lower catching means each being formed at the upper and lower ends of the slot, respectively, stopper pin slidably inserted through the arcuate slot, and an elastic means mounted on the stopper pin. With the vertical rotation of the armrest, the stopper pin is displaced along the arcuate slot and securely caught in either of said upper and lower catching means, by virtue of the resilient force of the elastic means, which brings the armrest into a locked state in either of a use position and a non-use position.

10 Claims, 3 Drawing Sheets

LOCKING MECHANISM FOR ARMREST

BACKGROUND OF THE INVENTION

1. Field of the Invention

The present invention relates to an armrest provided on the lateral wall of an automotive seat, and in particular relates to a locking mechanism for such an armrest, in which the arm rest is retained generally horizontally in a use position and upright in a non-use position.

2. Description of the Prior Art

In the past, an armrest of the type provided laterally of a seat has been equipped with various different kinds of locking mechanisms. However, most of the hitherto proposed locking mechanisms for that arm rest are rather complicated in structure and not so simple in its operation. For example, there have been known two typical armrest locking mechanisms respectively from the Japanese Laid-Open Publication No. 57-160415 and U.S. Pat. No. 3,807,799.

In the former Japanese prior art, the locking mechanism comprises a disc-like lock plate provided in a seat back and a disc-like stopper plate fixed on the armrest, the lock plate having a pair of projected pieces and the stopper plate having plural holes rowed circularly therein. By operating a lever, the lock plate is moved towards or withdrawn from the stopper plate, so that the projected pieces of the former are engaged into or disengaged from corresponding ones of the plural holes of the latter. Thus, the engagement and disengagement of the projected pieces into and from the holes of the stopper plate lead to the locking and unlocking of the armrest for its positional adjustment. However, the operating procedures of this prior art require the operation of the lever to unlock the armrest, then the manual rotation thereof at a desired use position, and again the operation of the lever to lock the armrest at that position, which causes an annoyance. Its structure is complicated, with a large number of components.

According to the latter U.S. prior art, the armrest locking mechanism disclosed therein comprises a bracket fixed on the seat back, a square hole perforated in the bracket, a rotational shaft of the armrest, and a square plate fixed on the rotational shaft. With this structure, the locking of the armrest is effected by fitting the square plate into the square hole in place in order to retain the armrest in a horizontal use position or an upright non-use position, and its unlocking is effected by disengaging the square plate from the hole, allowing rotation of the armrest. Yet, such locking and unlocking action is aided by the biasing force of spring, and especially the unlocking operation involves the step of moving the armrest outwardly from the seat back so as to disengage the square plate from the hole. Consequently, this prior art is not simplified in structure sufficiently and still leaves an annoying operation problem.

Thus, the conventional armrest locking mechanism has been defective in that it requires a great number of components and increased costs for assembling the same, and its operation efficiency remains to be improved.

SUMMARY OF THE INVENTION

With the above drawbacks in view, it is therefore an object of the present invention to provide an improved locking mechanism for an armrest which is greatly simplified in structure with quite a small number of parts therein and further is easy to operate.

In accomplishment of the object, the present invention comprises a shaft for rotatably supporting an armrest, an arcuate slot defined at the lateral wall of a seat back such that a circle along which the arcuate slot lies has its center disposed at the shaft coaxially, an upper catching means defined in the upper end of the arcuate slot, a lower catching means defined in the lower end of the arcuate slot, and a stopper pin fixed projectingly on the armrest, which stopper pin is provided with an elastic member and slidably inserted in the arcuate slot.

When the armrest is rotated into a use horizontal position, the stopper pin is moved along the arcuate slot to reach the lower catching means, whereupon the elastic member of the stopper pin is securely received or caught in the lower catching means so that the armrest is retained in the use horizontal position. Reversely, when it is desired to bring the armrest into a non-use upright or vertical position, the armrest is rotated upwardly, forcing the elastic member out from the lower catching means, and continues to be rotated until the elastic member of the stopper pin is then securely caught in the upper catching means, to thereby retain the armrest in the non-use upright position.

Accordingly, in the present invention, the components are greatly reduced in number, and therefore the structure of the present invention is exceptionally simple, which contributes to the saving of costs in terms of parts, preparation and assembly. Further, since the elastic member of the stopper pin serves as both locking and unlocking means, the mere rotation of the armrest brings the armrest per se into the locking/unlocking state, automatically, without any another steps of releasing and returning the armrest from and to the locked state, as in the foregoing prior arts. It is, therefore, extremely easy to execute the locking/unlocking operation.

DETAILED DESCRIPTION OF PREFERRED EMBODIMENT OF THE INVENTION

Figure 1:
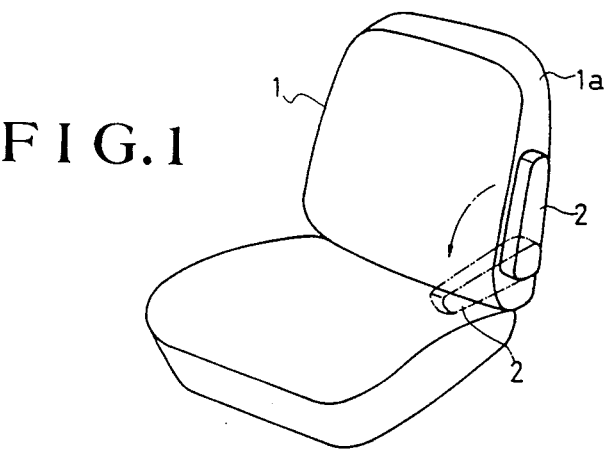
FIG. 1 is a perspective view of an armrest provided on a seat via locking mechanism in accordance with the present invention.

FIG. 1 illustrates the state in which an armrest (2) is rotatably mounted on the lateral wall (1) of a seat back (1). As indicated in the solid line, the armrest (2) is retained in a non-use upright or vertical position, with its body being superposed on the lateral wall (1) of the seat back (1), but the armrest (2) is rotatable downwardly in the direction of the arrow so as to be brought to a use horizontal position as indicated in the phantom line.

Figure 2:
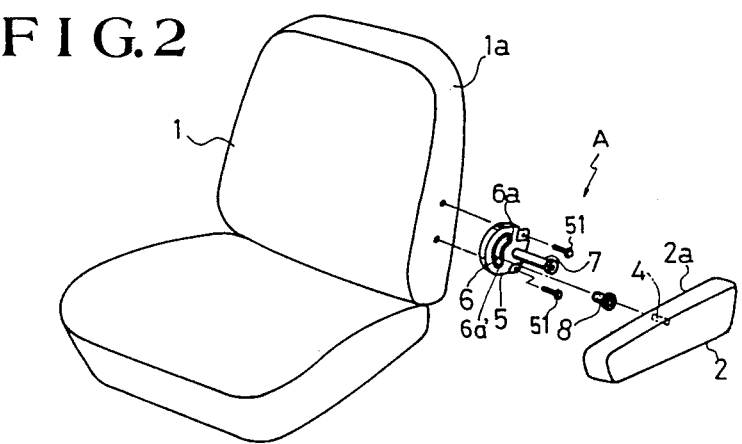
FIG. 2 is an exploded perspective view of the same armrest as in the FIG. 1.

As shown in FIG. 2, a locking mechanism (A) is provided between the lateral wall (1a) of the seat back (1) and the armrest (2). In the shown embodiment, the locking mechanism (A) is constructed as described below.

A base plate (5) is fixed to the lateral wall (1a) of the seat back (1), by means of screws (51)(51). The base plate (5) has a shaft (7) integrally formed therewith, erected thereupon for rotatably supporting the armrest (2), so that the armrest (2) is rotatable about the shaft (7). An arcuate slot (6) is formed in the base plate (5) such that it lies forwardly of the shaft (7) and the center of a circle along which the arcuate slot (6) lies is disposed at the axis of the shaft (7) in a coaxial manner. At the upper end of the arcuate slot (6), an upper catching aperture (6a) is formed, and at the lower end of the slot (6), a lower catching aperture (6a') is formed. A stopper pin (4) is fixed on the inner wall of the armrest (2), projecting therefrom, such that the stopper pin (4) is slidably inserted through the arcuate slot (6).

The upper and lower catching apertures (6a)(6a') are both formed in a generally circular shape, with such a arrangement wherein the former, at its lower part, has an open communication with the upper end of the arcuate slot (6), and the latter, at its upper part, has an open communication with the lower end of the slot (6). At the communicating point between the upper catching aperture (6a) and the upper end of the arcuate slot (6), a first narrow space (6b) is defined, and at the communicating point between the lower catching aperture (6a') and the lower end of the arcuate slot (6), a second narrow space (6b') is defined.

Figure 4:
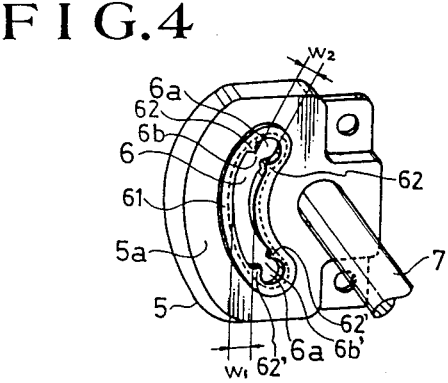
FIG. 4 is a perspective view of a base plate having an arcuate slot, a part of the locking mechanism in accordance with the present invention.

As indicated in FIG. 4, the arcuate slot (6) has a width (W1), and both first and second narrow spaces (6b)(6b') have a width (W2) which is smaller than the width (W1) of the arcuate slot (6).

It is desirable that the width (W2) of both first and second narrow spaces (6b)(6b') is set at a degree substantially equal to that obtained by the thickness (W3) of the stopper pin (4) (see FIG. 6) plus the doubled thickness of the elastic tubular member (8), so as to allow both stopper pin (4) and elastic tubular member (8) to pass through the narrow spaces (6b)(6b'), respectively, as will be discussed later.

Figure 6:
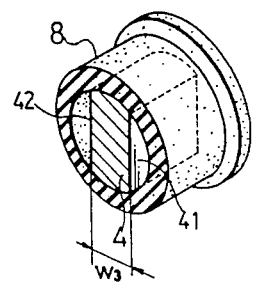
FIG. 6 is a perspective view of the stopper pin and an elastic member attached thereaound.

As shown in FIG. 6, the stopper pin (4) is formed in a plate-like shape of a rectangular cross-section, having the foregoin thickness (W3) defined between its both lateral walls (41)(42), and encircled by the elastic tubular member (8), of which cross-section assumes an annular shape. Preferably, the elastic tubular member (8) is made of a rubber or a soft synthetic resin material.

As best shown in FIG. 4, the arcuate slot (6) as well as the upper and lower catching apertures (6a)(6a') are covered with a bush member (61) along their respective entire inner peripheral edges. The bush member (61) is formed with a pair of opposed, spaced upper projections (62)(62) at a point corresponding to the foregoing first narrow space (6b) and with a pair of opposed, spaced lower projections (62')(62') at a point corresponding to the second narrow space (6b').

The bush member (61) functions to avoid wear of the elastic tubular member (8) which will occur due to its repeated sliding and resilient deformation within the arcuate slot (6).

It is preferable that the upper and lower catching apertures (6a)(6a') are equal in inner diameter to each other, and the inner diameter of the two apertures (6a)(6a') should be equal to or smaller than the width (W1) of the apertures slot (6).

Thus, the stopper pin (4) passes through the arcuate slot (6), with the elastic tubular member (8) being in a frictionally slidable contact with the bush member (61). It should be noted that the elastic tubular member (8) encircling the stopper pin (4) is larger in outer diameter than the inner diameter of both upper and lower catching apertures (6a)(6a') in order that the elastic tubular member (8), when entered into one of the catching apertures (6a)(6a'), expands itself resiliently therewithin so as to be provisionally caught by one of the catching apertures (6a)(6a') in a secure manner.

Figure 3:
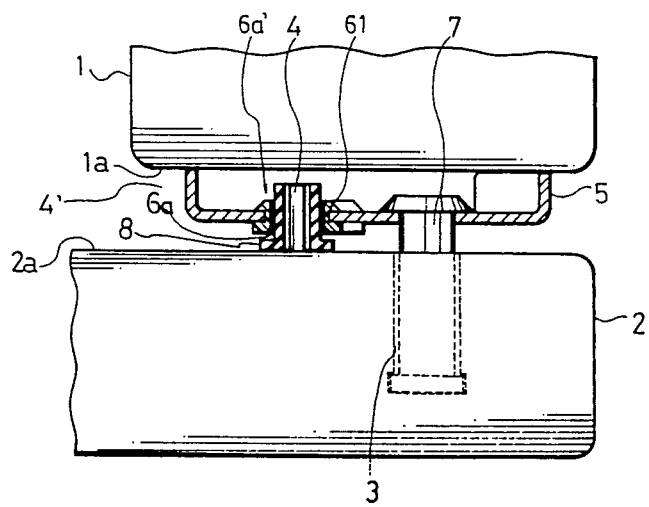
FIG. 3 is a cross-sectional view of the locking mechanism in accordance with the present invention, showing it to be disposed between the armrest and the lateral wall of the seat back of the seat.
Figure 5:
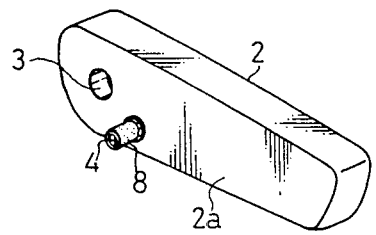
FIG. 5 is a perspective view of an armrest, which shows a stopper pin, a part of the locking mechanism, as being fixed on the arm rest.

Referring to FIG. 5, rearwardly of and at the inner lateral wall of the armrest (2), a rotation hole (3) is formed, in which the shaft (7) is rotatably secured, whereby the armrest is free to rotate about the shaft (7) laterally of the seat back (1). The stopper pin (4), about which the elastic tubular member (8) is attached, is shown as being located on the inner latteral wall of the armrest (2) at the point forwardly of the hole (3) and adjacent to the lower edge of the armrest (2), by the reason of the armrest (2), as viewed in the FIG. 5, being positioned horizontally. In this respect, it is to be understood that such horizontally positioned armrest (2) is in a use horizontal state, as will be described later, and therefore, the stopper pin (4) is in the state of being caught in the lower catching aperture (6a') of the arcuate slot (6), as can be seen from FIG. 3. Accordingly, the stopper pin (4) is disposed such as to be displaceable upwards and downwards along the arcuate slot (6), from the upper catching aperture (6a) down to the lower one (6a') thereof, or vice versa, when the armrest (2) is rotated downwardly into the use horizontal position or upwardly into the non-use upright position. For that purpose, the rectangular cross-section of the stopper pin (4) is oriented in a direction which corresponds to the longitudinal direction of the arcuate slot (6), so that the stopper pin (4) is smoothly moved along the arc track of the arcuate slot (6) with the vertical rotation of the armrest (2).

Figure 7:
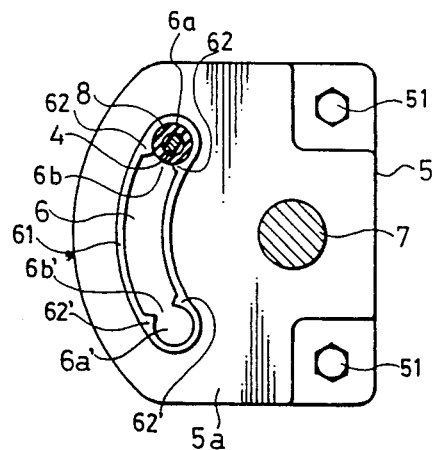
FIGS. 7, 8 and 9 are partially sectional views showing the movements of the stopper pin along the arcuate slot.
Figure 8:
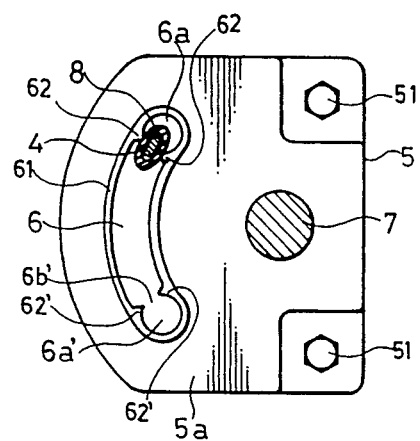
Figure 9:
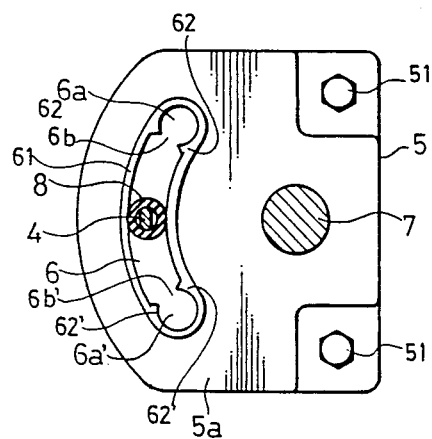

Now, with reference to FIGS. 7 through 9, when the armrest (2) is in a non-use upright position as in FIG. 1, the stopper pin (4) is in the state of being securely caught in the upper catching area (6a) due to the resilient expansive force of the elastic tubular member (8) acting upon the inner peripheral edge of the corresponding part of the bush member (61) as well as the two projections (62)(62), attempting to retain the stopper pin (4) in the upper catching aperture (6a), as seen in FIG. 7, against removal therefrom. Therefore, the armrest (2) is locked in a non-use upright or generally vertical position along the lateral wall (1a) of the seat back (1).

Then, when it is desired to release the armrest (2) from thus-locked state in the non-use position, the armrest (2) is rotated downwardly with a force overcoming the expansive force of the elastic tubular member (8). As illustrated in FIG. 8, the stopper pin (4) is then displaced into the first narrow space (6b) defined between the two opposed upper projections (62)(62), with the elastic tubular member (8) being depressed or collapsed at its both sides, overlaying the respective lateral wall (41)(42) of the stopper (4), into a generally oval shape. Because of the rectangular cross-section of the stopper pin (4) and the elliptically deformation of the elastic tubular member (8), with further downward rotation of the armrest (2), the stopper pin (4) and elastic tubular member (8) pass through the first narrow space (6b) and together are displaced into the slot (6). The elliptically deformed elastic tubular member (8), then, recovers its original circular shape within the slot (6).

As the armrest (2) continues to be rotated downwardly, the stopper pin (4) and elastic tubular member (8) are slidingly moved along the arcuate slot (6) with a proper frictional resistance, as shown in FIG. 9. This produces a gradual rotation of the armrest (2) shortly after the above-mentioned unlocking procedure, instead of a sudden rapid rotation thereof.

Thereafter, the stopper pin (4) and elastic tubular member (8) reach the second narrow space (6b'), and then, by adding a force to overcome the resilient expansive force of the member (8), still further downward rotation of the armrest (2) causes those two elements (4)(8) to pass through the second narrow space (6b'), undergoing a similar ellipical deformation at the side of elastic member (8), and to be securely received or caught in the lower catching aperture (6a'). Thus, the armrest (2) is locked in the use horizontal position as seen by the phantom line in FIG. 1.

To release the armrest (2) from the locked state in the use horizontal position and return it to the non-use upright position, the armrest (2) is then rotated upwardly, overcoming the expansive force of the elastic member (8), in a reverse manner as against the above-described armrest rotation procedures.

From the above description, it is appreciated that the main components of the locking mechanism in accordance with the present invention comprise merely the arcuate slot (6), a pair of the upper and lower catching apertures (6a)(6a'), the stopper pin (4) and the elastic tubular member (8), hence providing an extremely simplified structure which contibutes to the saving of costs in terms of parts preparation and assemblage. Moreover, the locking and uloking operations of the armrest (2) are effected by simply rotating the armrest (2) per se in the upward and downward diretions, respectively, and as such, there is no other additional procedure for releasing the armrest (2) from its locked state for a subsequent locking step, which has been found in any of prior arts. As another advantageous aspect, the stopper pin (4) is always in a frictional slidable contact with the inner peripheral edges of the arcuate slot (6): The stopper pin (4) is slidable along the slot (6) without clearance therebetween, thus avoiding possible wobble of the armrest (2) during its vertical rotation strokes between the non-use upright and use horizontal positions.

While having described the present invention as above, it should be understood that the invention is not limited to the illustrated embodiment, but other various modifications, replacements and additions may structurally be possible without departing from the spirit and scope of the appended claim for the invention.

What is claimed is:

1. A locking mechanism for an armrest, in which the armrest is rotatably mounted on a lateral wall of a seat back of a seat so as to be vertically rotatable between a non-use upright position and a use horizontal position, said locking mechanism comprising:
   a shaft provided at said lateral wall of said seat back, said shaft being adapted to rotatably support said armrest;
   an arcuate slot formed at said lateral wall of said seat back such said slot lies forwardly of said shaft and a center of a circle along which said arcuate slot lies is disposed at said shaft coaxially;
   an upper catching means and a lower catching means, each being formed at an upper end of said arcuate slot and a lower end of said arcuate slot, respectively, in such a manner that said upper catching means has a part-way open communication with said upper end of said arcuate slot, and that said lower catching means has a part-way open communication with said lower end of said arcuate slot;
   a pair of first opposed projections projecting from said arcuate slot for defining a first narrow space between said upper catching means and said upper end of said arcuate slot;
   a pair of second opposed projections projecting from said arcuate slot for defining a second narrow space between said lower catching means and said lower end of said arcuate slot;
   a stopper pin provided on said armrest, said stopper pin being slidably inserted through said arcuate slot; and
   an elastic means mounted on said stopper pin, said elastic means being resiliently deformable and adapted to cause said stopper to be securely caught in either of said upper and lower catching means,
   whereby, when said armrest is rotated downwardly to said use horizontal position, said stopper pin and elastic means are slidably displaced along said arcuate slot, with said elastic means being resiliently deformed at said second narrow space, and then securely caught in said lower catching means due to a resilient recovery force of said elastic means, and when said armrest is rotated upwardly to said non-use upright position, said stopper pin and elastic means are slidingly displaced along said arcuate slot, with said elastic means being resiliently deformed at said first narrow space, and then securely caught in said upper catching means due to said resilient recovery force of said elastic means.

2. The locking mechanism for armrest according to claim 1, wherein said stopper pin is formed in a plate-like shape having a rectangular cross-section, and wherein said rectangular cross-section of said stopper pin is oriented in a direction which corresponds to an longitudinal direction of said arcuate slot, so that said stopper pin is moved along the arcuate slot with the vertical rotation of said armrest.

3. The locking mechanism for armrest according to claim 1, wherein said elastic means comprises an elastic tubular member having an annular cross-section and is securely attached about said stopper pin, and wherein said elastic tubular member is so formed as to have a dimensions that permits its frictionally slidable contact with inner peripheral edges respectively of said arcuate slot, said upper and lower catching means and said first and second narrow spaces.

4. The locking mechanism for armrest according to claim 1, wherein inner peripheral edges respectively of said arcuate slot, said upper and lower catching means and said first and second narrow spaces, are covered with a bush member, and wherein said elastic means is slidably contacted with said bush member.

5. The locking mechanism for armrest according to claim 3, wherein each of said first and second narrow spaces is so defined as to have a width substantially equal to a degree obtained by a thickness of said stopper pin plus a thickness of said elastic mean, said thickness of the latter being created when it is deformed at each of said first and second narrow spaces.

6. The locking mechanism for armrest according to claim 1, wherein said upper and lower catching means are identical to each other in diameter, and are both smaller in diameter than a width of said arcuate slot.

7. The locking mechanism for armrest according to claim 1, wherein said elastic means is greater in dimensions than an inner diameter of each of said upper and lower catching means.

8. The locking mechanism for armrest according to claim 1, wherein said arcuate slot, said upper and lower catching means and said first and second narrow spaces are provided on a base plate which is fixed on said lateral wall of said seat back.

9. The locking mechanism for armrest according to claim 1, wherein said elastic means comprises an elastic member made of a material selected from one of a rubber and synthetic resin material.

10. The locking mechanism for armrest according to claim 1, wherein said upper and lower catching means comprise upper and lower circular catching apertures, respectively.

* * * * *